US005899806A

United States Patent [19]

Hase et al.

[11] Patent Number: 5,899,806

[45] Date of Patent: May 4, 1999

[54] AIR REGULATOR FOR VEHICLES

[75] Inventors: Tomoki Hase; Hideo Kanno; Hideto Noyama, all of Nagoya; Tomoki Izawa, Nishi-kasugai-gun, all of Japan

[73] Assignee: Mitsubishi Heavy Industries, Ltd., Tokyo, Japan

[21] Appl. No.: 09/058,179

[22] Filed: Apr. 10, 1998

[30] Foreign Application Priority Data

Apr. 28, 1997 [JP] Japan .................................... 9-122841

[51] Int. Cl.[6] ........................................................ B60H 1/12

[52] U.S. Cl. ........................... 454/156; 454/160; 454/161

[58] Field of Search .............................. 454/69, 121, 156, 454/160, 161; 165/42, 43

[56] References Cited

U.S. PATENT DOCUMENTS 3,288,048 11/1966 Laing ...................................... 454/160

4,390,124 6/1983 Nilsson ............................... 454/159 X

*Primary Examiner*—Harold Joyce

*Attorney, Agent, or Firm*—Oblon, Spivak, McClelland, Maier & Neustadt, P.C.

[57] ABSTRACT

The air regulator for vehicles is provided with, within a casing, an evaporator which cools air, a heater which reheats the air cooled by the evaporator, and an air mix damper which is disposed on the downstream side of the evaporator and on the upstream side of the heater and in close proximity thereto, and which regulates the amount of air passing through the heater; a heat reflecting surface is formed on the heater side of the air mix damper. By means of this, it is possible to prevent the thermal deformation of the air mix damper by reflecting the radiation from the heater side using the heat reflecting surface. Accordingly, the sliding problems of the air mix damper can be prevented.

8 Claims, 5 Drawing Sheets

2 16b 3 22 1a 1 21 10 13 10a 19 16a 16c 15 12 14 10c 5 11 26 27 6 116 26 102 101 100 4

AIR REGULATOR FOR VEHICLES

BACKGROUND OF THE INVENTION

1. Technical Field

The present invention relates to an air regulator for vehicles which is optimal for use in passenger vehicles.

2. Related Art

An example of a vehicular air regulator which is employed in passenger vehicles is the device for which the present applicants have submitted a Japanese patent application (Japanese Patent Application No. HEI 8-209177).

FIG. 4 is a cross sectional view showing this air regulator for vehicles, FIG. 5 is a cross sectional view taken along the line A—A in FIG. 4, FIG. 6 is a view taken along the B—B arrows in FIG. 5, and FIG. 7 is an angle view showing the blowout mode changeover damper.

An evaporator 4, a heater 5, an air mix damper 6, a blowout mode changeover damper 10, and the like are disposed within a casing 1 which is provided within the center console.

The evaporator 4 is affixed to the bottom portion of the casing 1 in such a posture as to angle upwards gradually in the direction of the air intake port 25.

The heater 5 is provided so as to be slightly angled at a position to one side within the casing 1.

The air mix damper 6 is a slide type air mix damper and is provided on the downstream side of the evaporator 4 and on the upstream side of heater 5 so as to be in close proximity thereto.

A pair of racks 100 are provided in a parallel manner at the bottom surface of the air mix damper 6 so as to maintain a gap therebetween, and pinions 101, 101 which engage with this pair of racks 100 are affixed to a rotational axle 102.

This rotational axle 102 is accepted by the left and right side walls 1*b*, 1*c* of casing 1 via bearings and the like, and gears 103 which are affixed to the projecting ends thereof engage with teeth 107 which are formed on the outer circumference of a drive plate 104.

When motor 105 is driven, drive plate 104 rotates about the axle 106, and in accordance with this, the air mix damper 6 is driven via gears 103, rotational axle 102, pinions 101 and racks 100, and is caused to slide in a direction perpendicular to the direction of air flow, guided in guide 26. Drive plate 104 may be rotated by hand about axle 106 instead of being driven by motor 105.

Blowout mode changeover damper 10 is provided in the air mix region above heater 5 so as to be freely rotatable about a rotational axle 15.

As shown in FIG. 6, this damper 10 has the overall shape of a hollow barrel, and on the cylindrical part 10*a* thereof, a defrost exit 12, a face exit 13, and an inlet 11 which is in constant communication with the air mix region, are formed with predetermined gaps therebetween in the circumferencial direction, and fan shaped foot exits 14 are formed in the side walls 10*b* and 10*c* thereof, and a rotational axle 15 is provided in the center thereof. This rotational axle 15 is accepted by the left and right side walls 1*b* and 1*c* of the casing 1.

Furthermore, partitions 16*a*, 16*b*, and 16*c*, which form seals by close contact with the outer surface of cylindrical part 10*a* with a predetermined spacing in the circumferencial direction thereof, are formed in casing 1.

Additionally, a face blowout port 2 is formed in the upper surface 1*a* of casing 1 so as to be positioned between projections 16*a* and 16*b*, and a defrost blowout port 3 is also therein to so as to be positioned between projections 16*b* and 16*c*, and foot blowout ports 19 are formed on the left and right side walls 1*b* and 1*c* of casing 1 so as to engage with foot exits 14.

Furthermore, in casing 1, a face duct 21, which communicates with face blowout port 2, a defrost duct 22, which communicates with defrost blowout port 3, and a foot duct 23, which communicates with foot blowout port 19, are coupled.

However, during the operation of the air regulator, the air within the vehicle and/or external air, which is motivated by a blower not depicted, enters casing 1 from air intake port 25, and in the process of passing through evaporator 4, this air is cooled by means of heat exchange with a cooling medium.

The flow of this air is split by air mix damper 6; the air flowing on the right side of air mix damper 6 enters heater 5 and is heated by means of heat exchange with engine coolant, and after this is combined with air flowing through a bypass path 27 formed on the left side of air mix damper 6, and becomes air regulated at a specified temperature.

This regulated air passes through the intake port 11 of blowout mode changeover damper 10, and is blown out from one or two of the blowout ports 2, 3, and 19, which are selected by means of rotating damper 10 about rotational axle 15.

That is to say, in the case in which damper 10 occupies the rotational angle position shown in FIG. 3, the regulated air passes through face exit 13, face blowout port 2, and face duct 21, and is blown out in the direction of the upper half of the body of the passengers of the vehicle.

When damper 10 is rotated slightly in a counter clockwise direction in FIG. 3, face exit 13 is partially sealed, and face exit 14 partially engages with foot blowout port 19, so that a portion of the regulated air is blown out of the face blowout port 2, while the remainder simultaneously passes through foot exit 14, foot blowout port 19, and foot duct 23 and is blown out in the direction of the feet of the passengers of the vehicle.

When damper 10 is further rotated in a counter clockwise direction, the communication between face exit 13 and face blowout port 2 is cut off, and only foot exit 14 engages with foot blowout port 19, so that the regulated air is blown solely out of the foot blowout port 19.

When damper 10 is further rotated, foot exit 14 and foot blowout port 19 are partially engaged, and defrost exit 12 partially communicates with defrost blowout port 3, so that a portion of the regulated air is blown out of the foot blowout port 19, while simultaneously, the remainder of the regulated air passes through defrost exit 12, defrost blowout port 3, and defrost duct 22, and is blown out in the direction of the interior surface of the windshield and the like.

When the damper 10 is further rotated, foot exit 14 and foot blowout port 19 no longer are engaged, and only defrost exit 12 engages with defrost blowout port 3, so that the regulated air is blown solely out of the defrost blowout port 3.

In the conventional air regulator described above, the air mix damper 6 is on the downstream side of the evaporator 4, and is installed on the upstream side of heater 5 and is in close proximity therewith, so that the upper surface thereof is heated by the radiation from the heater 5, and the lower surface thereof is cooled by the air flowing through the evaporator 4.

When this occurs, air mix damper 6 is upwardly thermally deformed in a convex manner as a result of the difference in temperature between the upper and lower surfaces thereof, and the racks 100 cease to engage with the pinions 101, so that it becomes impossible to slide the air mix damper 6.

SUMMARY OF THE INVENTION

The present invention solves the problems described above; it comprises an air regulator for vehicles which is provided with, in a casing: an evaporator, which cools air; a heater, which reheats the air cooled by the evaporator; and an air mix damper, which is disposed on the downstream side of the evaporator and on the upstream side of the heater and in close proximity thereto, and which regulates the amount of air flowing through the heater; and in which a heat reflecting surface is formed on the heater side of the air mix damper.

In accordance with the air regulator for vehicles of the present invention, a heat reflecting surface is formed on the heater side of the air mix damper, so that the radiation from the heater side is reflected by the heat reflecting surface, and it is thus possible to prevent the thermal deformation of the air mix damper. Accordingly, the sliding problems of the air mix damper can be prevented.

DESCRIPTION OF THE PREFERRED EMBODIMENT

Hereinbelow, an embodiment of the air regulator for vehicles of the present invention will be explained based on the figures.

Figure 1:
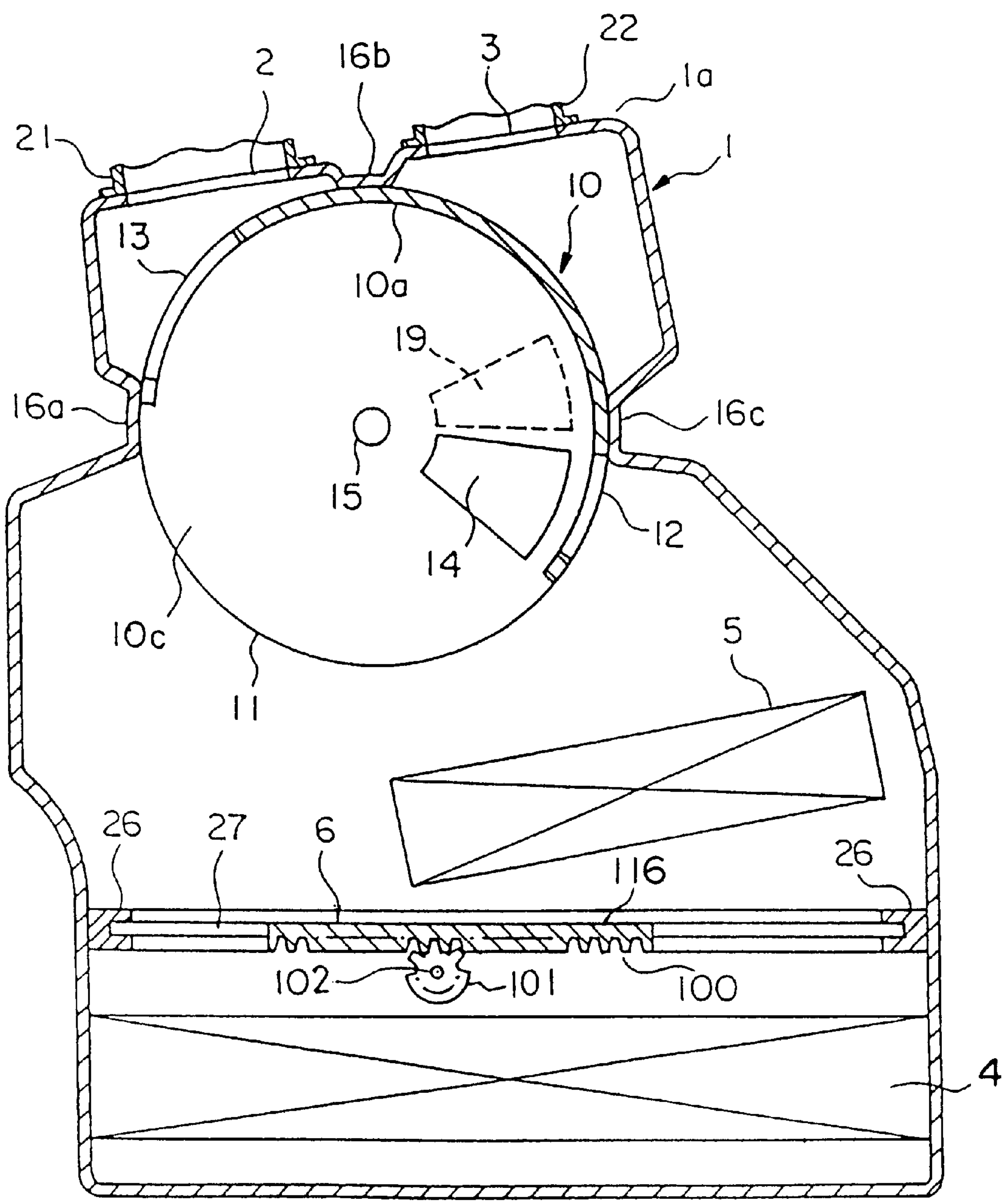
FIG. 1 is a cross sectional view showing an embodiment of the air regulator for vehicles of the present invention.
Figure 2:
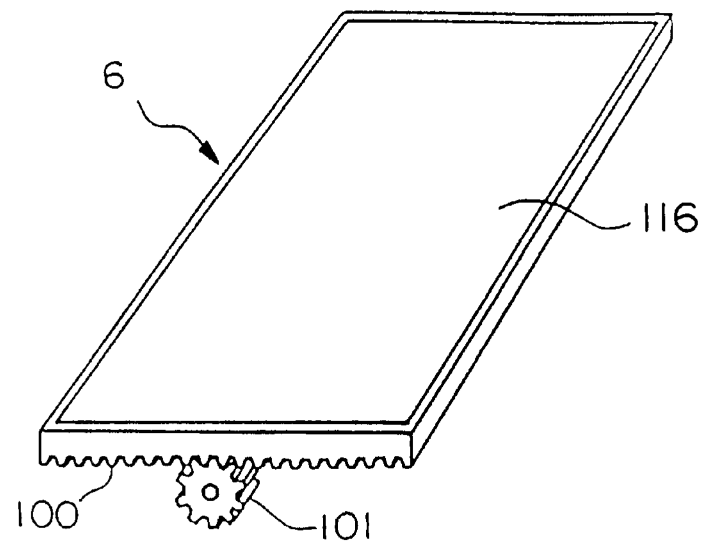
FIG. 2 is an angle view showing the air mix damper of an embodiment of the present invention.
Figure 4:
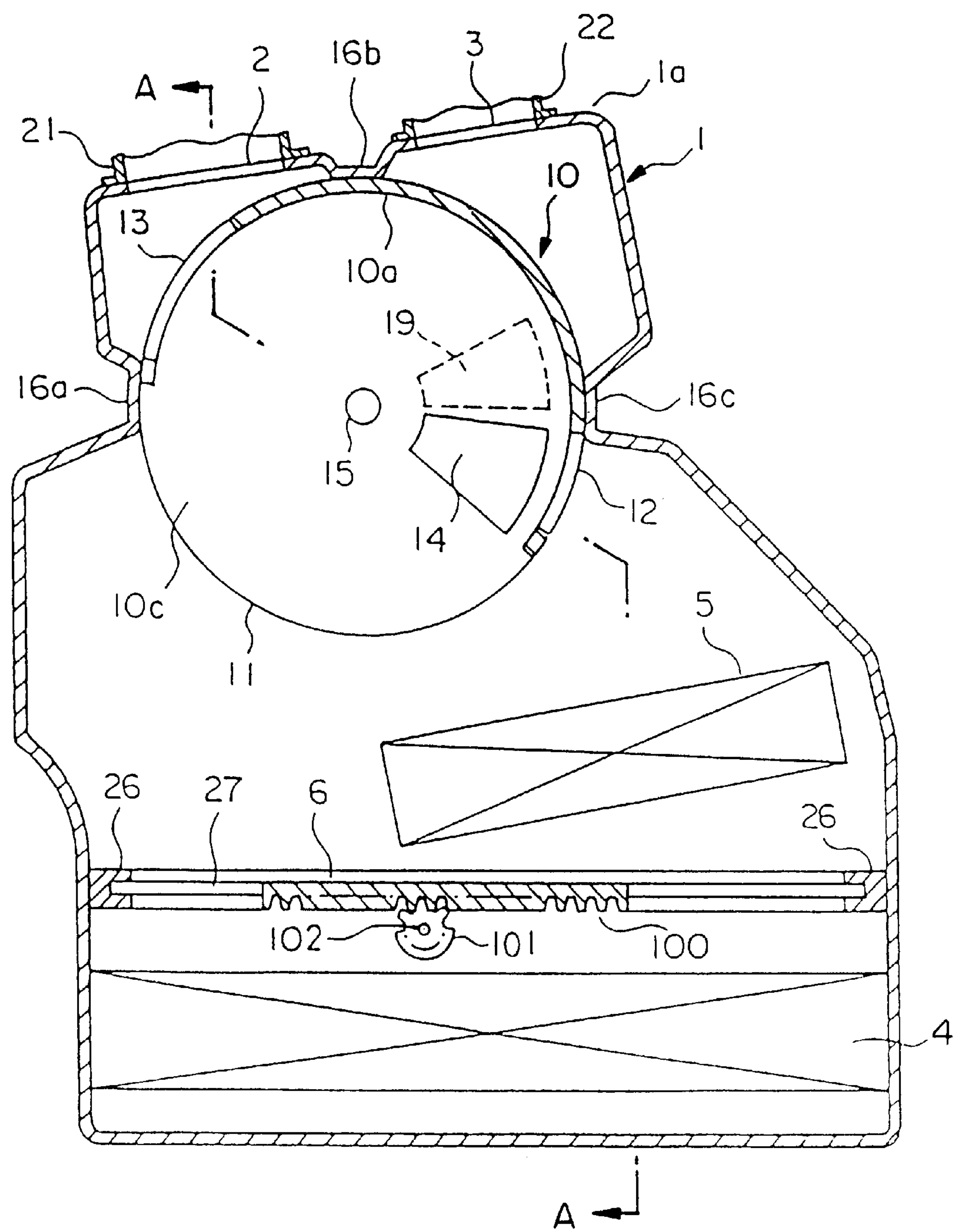
FIG. 4 is a cross sectional view showing a conventional air regulator for vehicles.
Figure 5:
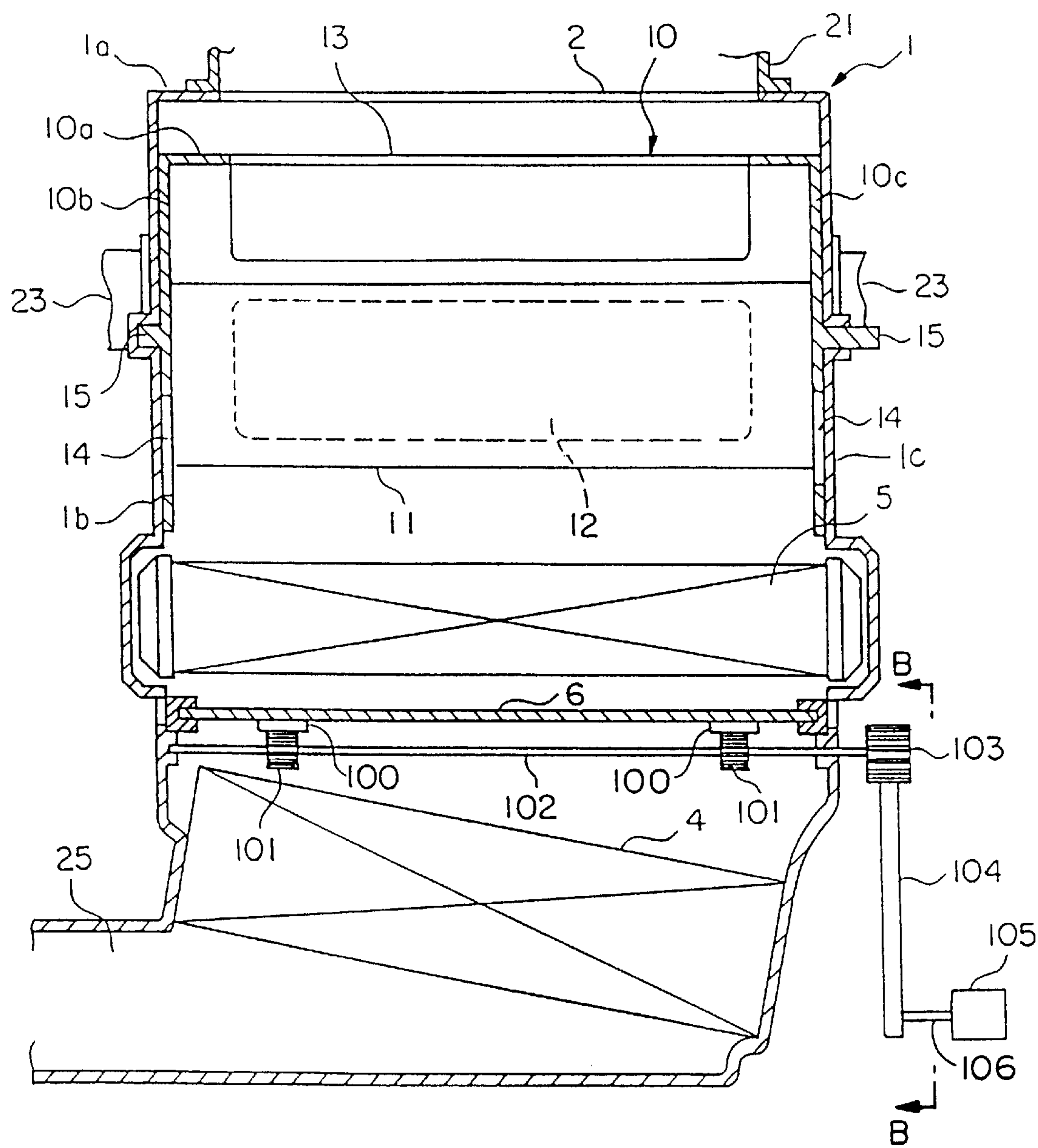
FIG. 5 is a cross sectional view taken along the line A—A of FIG. 4.
Figure 6:
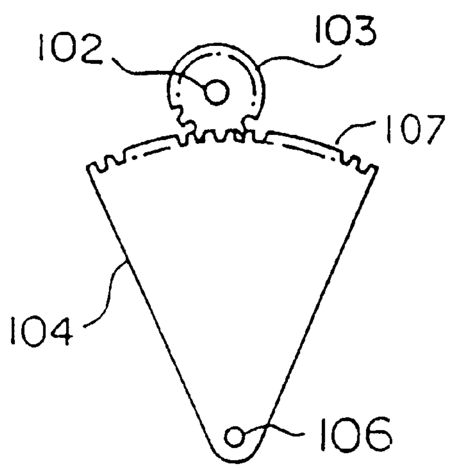
FIG. 6 is a view taken along the arrows of the B—B line in FIG. 5.
Figure 7:
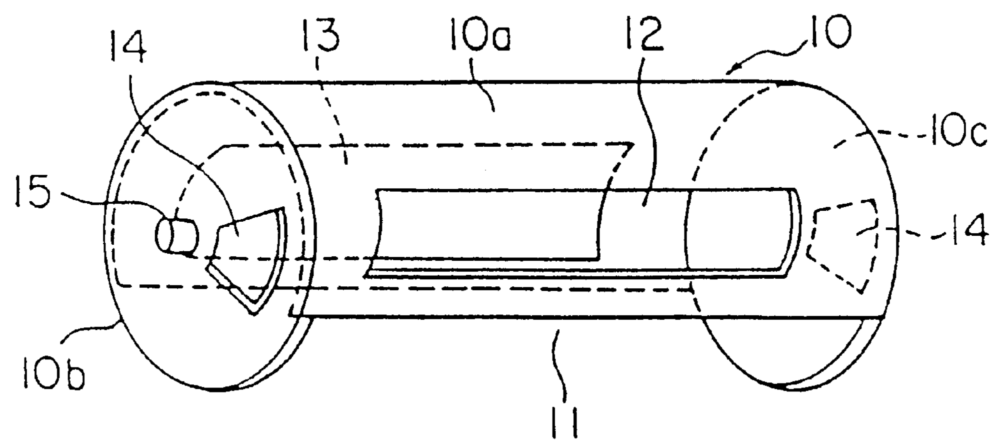
FIG. 7 is an angle view showing the blowout mode changeover damper of a conventional air regulator for vehicles.

FIG. 1 is a cross sectional view showing this air regulator for vehicles, while FIG. 2 is an angled view showing the air mix damper of this device; FIG. 1 corresponds to FIG. 4, which shows a conventional device.

A heat reflecting surface 116 comprising a polished metal surface or the like is formed at the upper surface of the air mix damper 6 of this device at the side of the heater 5.

This heat reflecting surface 116 is formed either by applying a material having a high heat reflection ratio to the upper surface on the side of heater 5, or by conducting surface treatment such as metallic plating treatment or the like on the upper surface.

Metal leaf such as aluminum leaf or the like, or metallic plate such as thin aluminum plate or the like, may be preferentially employed as the material having a high heat reflection ratio.

The other structure is identical to that of the conventional device shown in FIGS. 4 through 7, and parts corresponding thereto are given identical reference numbers and a description thereof is omitted here.

However, the radiation from heater 5 is reflected by the heat reflecting surface 116 formed on the upper surface of air mix damper 6 at the side of heater 5, so that the temperature increase of the upper surface of air mix damper 6 is controlled, and accordingly, it is possible to prevent the thermal deformation of air mix damper 6.

Figure 3:
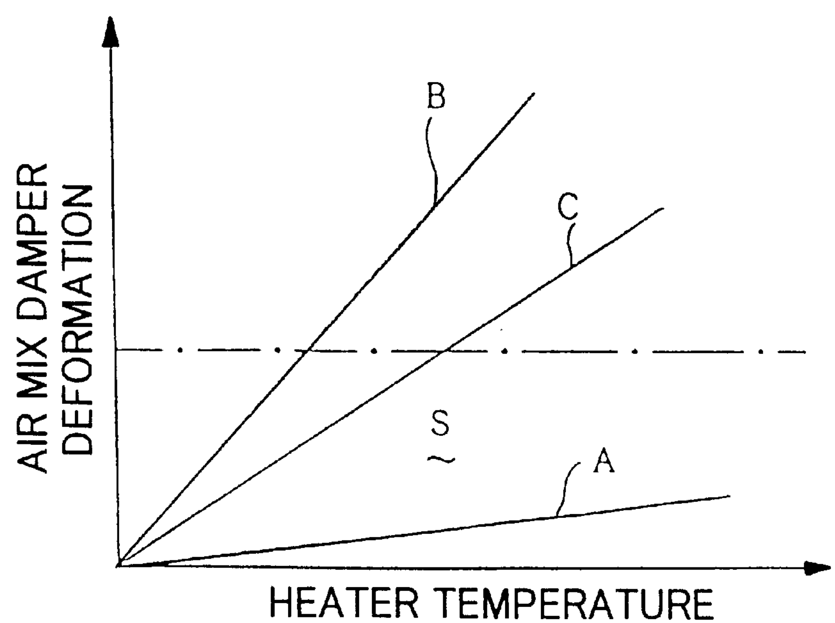
FIG. 3 shows the relationship between the amount of deformation of the air mix damper and the temperature of the heater.

FIG. 3 shows the relationship between the temperature of heater 5 and the amount of deformation of the air mix damper 6, both with respect to the present invention and the conventional technology; the region S in the figure shows the range of operational suitability.

As seen in FIG. 3, while the device A of the present invention falls within the operational range S, the conventional device B, comprising a black colored resin surface, and the conventional device C, comprising a brown colored resin surface, both greatly deviate from the operational range S at the operational temperature of the heater 5.

What is claimed is:

1. A air regulator for vehicles, comprising, within a casing, an evaporator, which cools air, a heater, which reheats the air cooled by said evaporator, and an air mix damper, which is disposed on the downstream side of said evaporator, and on the upstream side of said heater and in close proximity thereto, and which regulates the amount of air passing through said heater, wherein a heat reflecting surface is formed on the heater side of said air mix damper.

2. An air regulator for vehicles in accordance with claim 1, wherein said heat reflecting surface is formed by applying a material having a high heat reflecting ratio to the heater side surface of said air mix damper.

3. An air regulator for vehicles in accordance with claim 2, wherein said material comprises one of metallic leaf and metallic plate.

4. An air regulator for vehicles in accordance with claim 3, wherein said metallic leaf comprises aluminum leaf.

5. An air regulator for vehicles in accordance with claim 3, wherein said metallic plate comprises aluminum plate.

6. An air regulator for vehicles in accordance with claim 1, wherein said heat reflecting surface is formed by surface treatment of the surface of said air mix damper on the heater side.

7. An air regulator for vehicles in accordance with claim 6, wherein said surface treatment comprises metallic plating treatment.

8. An air regulator for vehicles in accordance with claim 1, wherein said air mix damper comprises a slide type air mix damper.

* * * * *